United States Patent
Koester et al.

(10) Patent No.: US 10,663,091 B2
(45) Date of Patent: May 26, 2020

(54) OCTG PIPE SYSTEM AND METHOD OF MANUFACTURING THEREOF

(71) Applicant: Benteler Steel/Tube GmbH, Paderborn (DE)

(72) Inventors: Ralf Koester, Schlangen (DE); Andre Loemker, Velbert (DE)

(73) Assignee: BENTELER STEEL/TUBE GMBH, Paderborn (DE)

( * ) Notice: Subject to any disclaimer, the term of this patent is extended or adjusted under 35 U.S.C. 154(b) by 430 days.

(21) Appl. No.: 15/464,751

(22) Filed: Mar. 21, 2017

(65) Prior Publication Data
US 2017/0276265 A1 Sep. 28, 2017

(30) Foreign Application Priority Data
Mar. 22, 2016 (DE) .................. 10 2016 105 342

(51) Int. Cl.
| | | |
|---|---|---|
| *F16L 15/00* | (2006.01) | |
| *F16L 9/02* | (2006.01) | |
| *C21D 1/26* | (2006.01) | |
| *C21D 9/08* | (2006.01) | |
| *F16L 21/00* | (2006.01) | |

(52) U.S. Cl.
CPC .................. *F16L 9/02* (2013.01); *C21D 1/26* (2013.01); *C21D 9/08* (2013.01); *C21D 9/085* (2013.01); *F16L 15/006* (2013.01); *F16L 21/002* (2013.01)

(58) Field of Classification Search
CPC .................. F16L 15/00; F16L 47/16
USPC .................. 285/333, 334
See application file for complete search history.

(56) References Cited

U.S. PATENT DOCUMENTS

| | | | | | |
|---|---|---|---|---|---|
| 2,676,820 | A | * | 4/1954 | Boice | E21B 17/042 285/114 |
| 3,572,771 | A | * | 3/1971 | Redwine | E21B 17/16 285/148.11 |
| 3,989,554 | A | * | 11/1976 | Wisler | C22C 38/24 285/333 |
| 4,194,031 | A | * | 3/1980 | Cullum | E21B 17/1085 138/109 |
| 4,295,751 | A | * | 10/1981 | Holmberg | E21B 17/0426 285/334 |
| 4,416,476 | A | * | 11/1983 | Garrett | E21B 17/16 285/288.1 |
| 4,506,432 | A | * | 3/1985 | Smith | B23P 11/00 285/329 |

(Continued)

FOREIGN PATENT DOCUMENTS

| | | |
|---|---|---|
| AT | 18 439 T | 3/1986 |
| AT | 24 345 T | 1/1987 |

(Continued)

*Primary Examiner* — David Bochna
(74) *Attorney, Agent, or Firm* — Hauptman Ham, LLP

(57) ABSTRACT

A pipe system for oil country tubular goods (OCTG) and a method of manufacturing the OCTG pipe system is disclosed. The pipe system includes at least one OCTG pipe having a pipe body, the pipe body having at least one connection end formed in unipartite and materially integral manner with the pipe body for coupling to a second OCTG pipe. The OCTG pipe is formed in seamless fashion from a hardenable steel alloy, and the connection end has a yield strength higher than the yield strength of the pipe body.

14 Claims, 6 Drawing Sheets

(56) References Cited

U.S. PATENT DOCUMENTS

| | | | | |
|---|---|---|---|---|
| 5,788,401 | A * | 8/1998 | Drenth | E21B 17/042 |
| | | | | 285/332.3 |
| 5,853,199 | A * | 12/1998 | Wilson | E21B 17/00 |
| | | | | 285/45 |
| 7,510,219 | B2 * | 3/2009 | Huston | E21B 17/042 |
| | | | | 285/333 |
| 8,181,998 | B2 * | 5/2012 | Watts | F16L 15/004 |
| | | | | 285/334 |
| 8,678,447 | B2 * | 3/2014 | Chin | E21B 17/042 |
| | | | | 285/333 |
| 8,783,344 | B2 * | 7/2014 | Aung | E21B 17/10 |
| | | | | 166/241.1 |
| 9,085,942 | B2 * | 7/2015 | Hashem | E21B 17/1085 |
| 9,091,124 | B2 * | 7/2015 | Hashem | E21B 17/00 |
| 2003/0024708 | A1 | 2/2003 | Ring et al. | |
| 2003/0227170 | A1 * | 12/2003 | Hashem | C23C 16/0218 |
| | | | | 285/333 |
| 2010/0294401 | A1 | 11/2010 | Gomez et al. | |

FOREIGN PATENT DOCUMENTS

| | | |
|---|---|---|
| DE | 23 40 722 A1 | 2/1975 |
| DE | 10 2014 102 452 A1 | 8/2015 |

\* cited by examiner

OCTG PIPE SYSTEM AND METHOD OF MANUFACTURING THEREOF

CROSS REFERENCE TO RELATED APPLICATIONS

The present application claims priority from German Application Number 10 2016 105 342.2, filed Mar. 22, 2016, the disclosure of which is hereby incorporated by reference herein in its entirety.

BACKGROUND OF THE INVENTION

1. Field of the Invention

The present invention relates to a pipe system and, more specifically, to oil country tubular good (OCTG) pipe system, and a method manufacturing a unipartite and materially integral seamless OCTG pipe.

2. Description of the Related Art

The term "oil country tubular goods" and "OCTG" are used in this application to include pipe or tubular member associated with drilling, producing or servicing oil wells, natural gas wells, geothermal wells or any other subsurface wellbore. A wide variety of tubular members and oil country tubular goods (OCTG) may be releasably engaged with each other by threaded connections formed in accordance with teachings of the present invention.

The OCTG pipes are divided into drilling pipes, casing pipes and conduit pipes. The drilling pipes are used for transmitting the rotational movement to the drill and conveying a drilling fluid. The drilling pipes are subjected to a high torque.

The casing pipes are used to support the borehole. They are subject to axial stresses owing to internal pressure of a fluid conducted through and an external pressure of the externally situated rock layers.

The conduit pipes are used to transport the oil or gas, which are transmitted in fluid or gaseous form.

OCTG pipes usually have a length of up to 12 m, and are generally standardized to 9 m.

For connecting the OCTG pipes, there are various standardized connection types in the American Petroleum Institute (API) Spec 5 CT. There are three API connections: external-upset tubing, non-upset tubing, and integral-joint tubing. Aside from these API connections, numerous manufacturer-specific connections of two OCTG pipes also exist.

Many connection types have in common the fact that a relatively large outer diameter is formed in the region of the connection, in particular because of a sleeve. The sleeves are generally screwed. A thread cut into the outer shell surface of a pipe end results in weakening of the strength of the pipe. To compensate for this, it is known from the prior art for the pipe ends to be upset, resulting in an increase in the wall thickness. The external thread may then be cut into the region with increased wall thickness. However, this results in the production process, in additional costs for the upsetting process, and a further enlargement of the outer diameter.

SUMMARY OF THE INVENTION

It is therefore an object of the present invention to provide an oil and country tubular goods (OCTG) pipe system and a method for producing an OCTG pipe which overcomes the disadvantages known from the prior art.

The OCTG pipe system according to the present invention has at least one OCTG pipe which has a pipe body with at least one connection end, formed in unipartite and materially integral fashion, for coupling to a further OCTG pipe, and the OCTG pipe is formed in seamless fashion from a hardenable steel alloy.

The connection end of the OCTG pipe system has a yield strength higher than the yield strength of the pipe body. The yield strength is the offset yield strength Rp 0.2 and will hereinafter also be described as strength.

The OCTG pipe system also preferably comprises a connection of two OCTG pipes, and in particular a pipe sleeve. The pipe sleeve has an equal or higher yield strength in relation to the connection end of the OCTG pipe. It is possible for the upsetting process on the pipe end on a conventional OCTG pipe to be omitted, or less intense upsetting is required. At the same time, however, adequate or increased strength is realized in the connection region of two OCTG pipes.

A yield strength of the connection end of between 600 MPa and 1300 MPa, and in particular between 900 MPa and 1200 Mpa is set. The yield strength of the pipe body preferably lies between 500 MPa and 900 MPa, and more specifically between 600 MPa and 800 MPa.

The pipe is composed of a hardenable steel alloy, is homogeneously warmed to a hardening temperature, and is quench hardened. During subsequent annealing after the hardening treatment, targeted setting of the strength is realized. This annealing treatment is in part performed with different parameters, wherein the entire pipe is annealed, which is also described as complete annealing. However, every length section of the hardened pipe does not have to be annealed at the same time and/or with the same intensity. The higher strength in the pipe ends is achieved by virtue of the intensity of the annealing of the pipe end being reduced in relation to the pipe body. The annealing is performed in the region of the pipe end for a shorter period of time and/or with a reduced introduction of heat, such that the strength set as a result of the hardening process is reduced only slightly. The pipe body itself is annealed with relatively high intensity, such that here, a considerably greater reduction in strength, in particular in yield strength, in relation to the pipe end, but at the same time a desired setting of the ductility are achieved.

It is also conceivable for the pipe first to be completely hardened, and for the pipe to subsequently be completely annealed homogeneously. Then, in a further annealing step, the pipe body is annealed once again such that the pipe body becomes softer in relation to the pipe ends as a result of the second annealing step.

Between the connection end and the pipe body a transition section is formed which extends with a length of between 10 mm and 300 mm, preferably with a length of between 50 mm to 200 mm, and more specifically of less than 180 mm, in the longitudinal direction of the OCTG pipe. The connection end itself extends with a length of 200 mm to 500 mm in the longitudinal direction of the pipe, a thread on the connection end extending with a length of up to 300 mm, preferably up to 100 mm, and more specifically up to 75 mm, in the longitudinal direction, in particular proceeding from the free end.

In the transition section, the yield strength decreases from the connection end to the pipe body with a gradient of greater than 10%. This means that the strength of the pipe end is at least 10% greater than the strength of the pipe body. The gradient is preferably greater than 15%, in particular greater than 20%.

The connection end may have an outer diameter which is smaller than or equal to the outer diameter of the pipe body. Thus, the cutting-in of an external thread can lead to a slight decrease in outer diameter. The weakening as a result of the material being removed in the region of the connection end is however compensated by the relatively high strength of the connection end. Alternatively or in addition, it may be provided that, in the connection end, at least in length sections, a wall thickness is formed which is smaller than or equal to the wall thickness of the pipe body. Hence, the wall thickness can be decreased as a result of the cutting-in of an external thread. The presence of less material in the wall is in turn compensated by the relatively high strength in the region of the connection end.

It would also be conceivable for the connection end to have a greater wall thickness and/or a greater outer diameter than the pipe body. This may be realized by means of upsetting of the pipe at the connection end to be formed. In relation to the known prior art OCTG pipes, however, only relatively little upsetting is necessary. This leads to material and weight savings and also to a relatively small outer diameter in the connection region of two OCTG pipes in relation to connections known from the prior art. As a result of the relatively low intensity of the annealing of the pipe end, no additional expenditure of energy is necessary for the relatively large wall thickness, known from the prior art, of the upset pipe end to be reduced in strength to a strength equal to that of the pipe body.

A further part of the OCTG pipe system according to the invention is a pipe connection sleeve which is formed from a hardenable steel alloy and which likewise has a yield strength of between 800 MPa and 1300 MPa, in particular between 900 MPa and 1200 MPa. The pipe connection sleeve according to the invention may thus also have a smaller outer diameter and/or a smaller wall thickness in relation to pipe connection sleeves known from the prior art. The pipe connection sleeve preferably has an internal thread.

The OCTG pipe system, in particular in the connection region of two OCTG pipes, has a relatively small outer diameter and/or relatively high stability, because at least the load capacity of the pipe body is achieved in the region of the pipe connections. Preferably, as a result of the relatively high strength, a higher load capacity is realized in the region of the connection than in the pipe body.

Moreover, in relation to the longitudinal direction, no sharp-edged transition section is formed between connection end and pipe body, with the transition rather being of flowing form. This is realized in particular owing to heat conduction in the pipe wall during the partial annealing after the homogeneous hardening.

The present invention also relates to a method for producing a unipartite and materially integral, seamless OCTG pipe having a pipe body and having at least one, preferably two unipartite and materially integral connection ends and composed of a hardenable steel alloy, which method comprising the steps:

providing a seamlessly rolled, cut-to-length pipe,
homogeneously warming and quench hardening the pipe,
annealing the hardened pipe, wherein a connection end is
    annealed with a lower intensity than the pipe body, and
    in the process setting a yield strength of between 800
    and 1300 MPa, in particular between 900 and 1200
    MPa, in the connection end and a yield strength of the
    pipe body of between 500 and 900 MPa, preferably
    between 600 and 800 MPa.

In particular, the entire hardened pipe is annealed. The annealing may be performed such that the entire pipe is annealed at the same time. For example, the pipe is placed into a static annealing apparatus, and a targeted partial introduction of heat is performed. In particular, the annealing is performed by induction. In order that now, according to the invention, the connection ends at the pipe ends have after the annealing a higher yield strength than a pipe body arranged between the pipe ends, annealing is performed, in part, with mutually different energy density and/or introduction of heat and/or treatment time. For example, it is possible for multiple induction coils to be arranged in series. The respectively outer induction coils which are arranged in the region of the connection ends are consequently operated with relatively low energy, such that a relatively small amount of heat is induced.

To define the transition section between pipe body and connection end, it is possible for auxiliary heating means, for example, gas flames, lasers, high-energy beams, friction heat, heat of chemical reaction, or else plasma to be used. However, it is preferable for annealing to be performed by inductive means. The heat conduction that arises in the wall of the pipe between two differently annealed length sections makes it possible to realize a correspondingly flowing transition of the strength in the material structure from the relatively hard connection end to the relatively soft pipe body.

Furthermore, it is preferable for the entire pipe to be caused to perform a relative movement in its longitudinal direction through an annealing apparatus. By means of the transportation speed and/or the heat energy that is introduced by the annealing apparatus in the respective length section of the pipe passing the annealing apparatus, it is thus possible for the yield strength to be set to the desired value. For example, when a connection end is guided through the annealing apparatus, a higher yield strength is set by means of a relatively low introduction of heat. When the pipe body passes the annealing apparatus, the introduced heat energy is increased, such that the yield strength is further reduced in the region of the pipe body. In this way, the OCTG pipe system, when used in an OCTG conveying area, is more flexible than OCTG pipes known from the prior art. This facilitates handling in particular during introduction into the borehole, and during conveying operation.

BRIEF DESCRIPTION OF THE DRAWINGS

The present invention will now be described, by way of example, with reference to the accompanying drawings, in which.

In the figures, the same reference designations are used for identical or similar components, even if a repeated description is omitted for reasons of simplicity.

DETAILED DESCRIPTION OF SOME EMBODIMENTS

Figure 1:
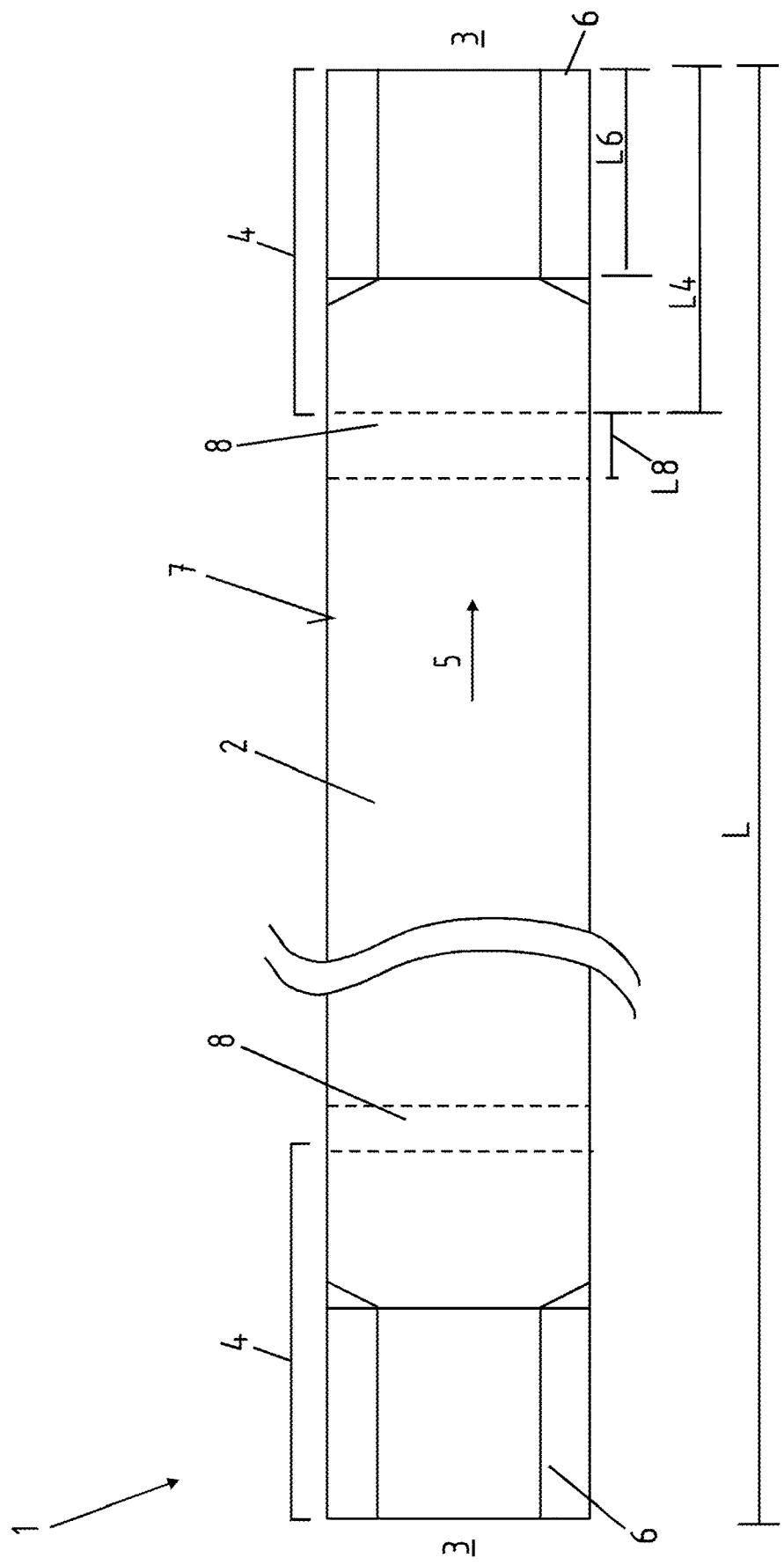
FIG. 1 is a side view of an OCTG pipe according to one embodiment of the present invention.
Figure 2:
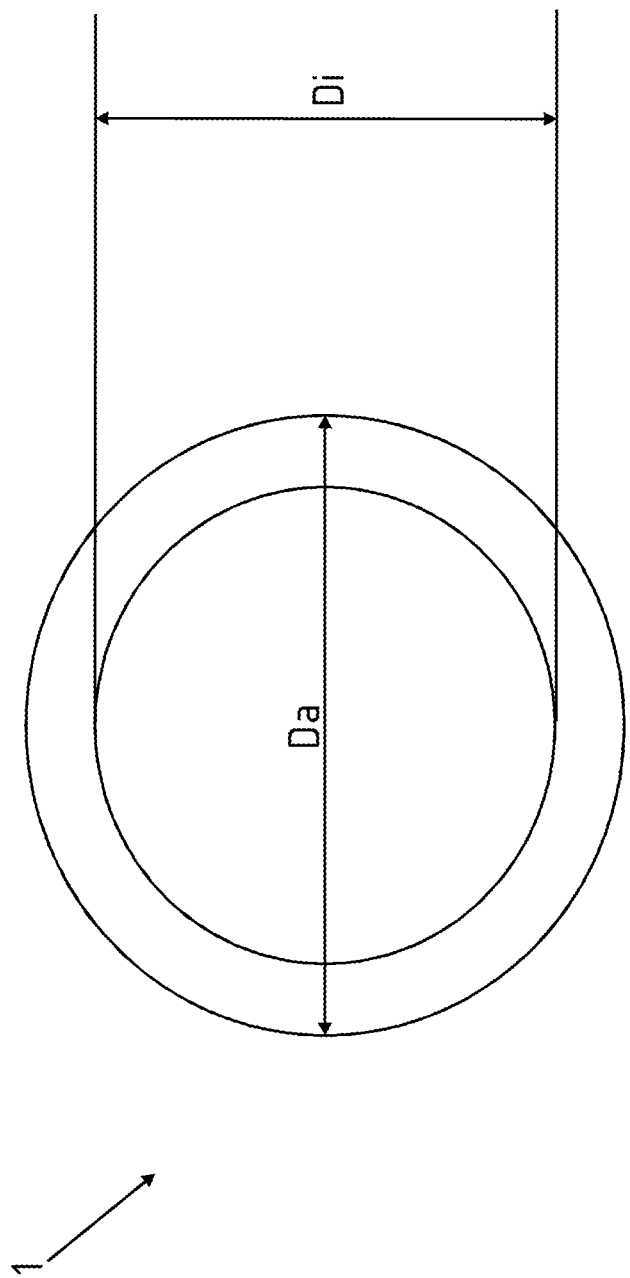
FIG. 2 is an end view of the OCTG pipe shown in FIG. 1.
Figure 3:
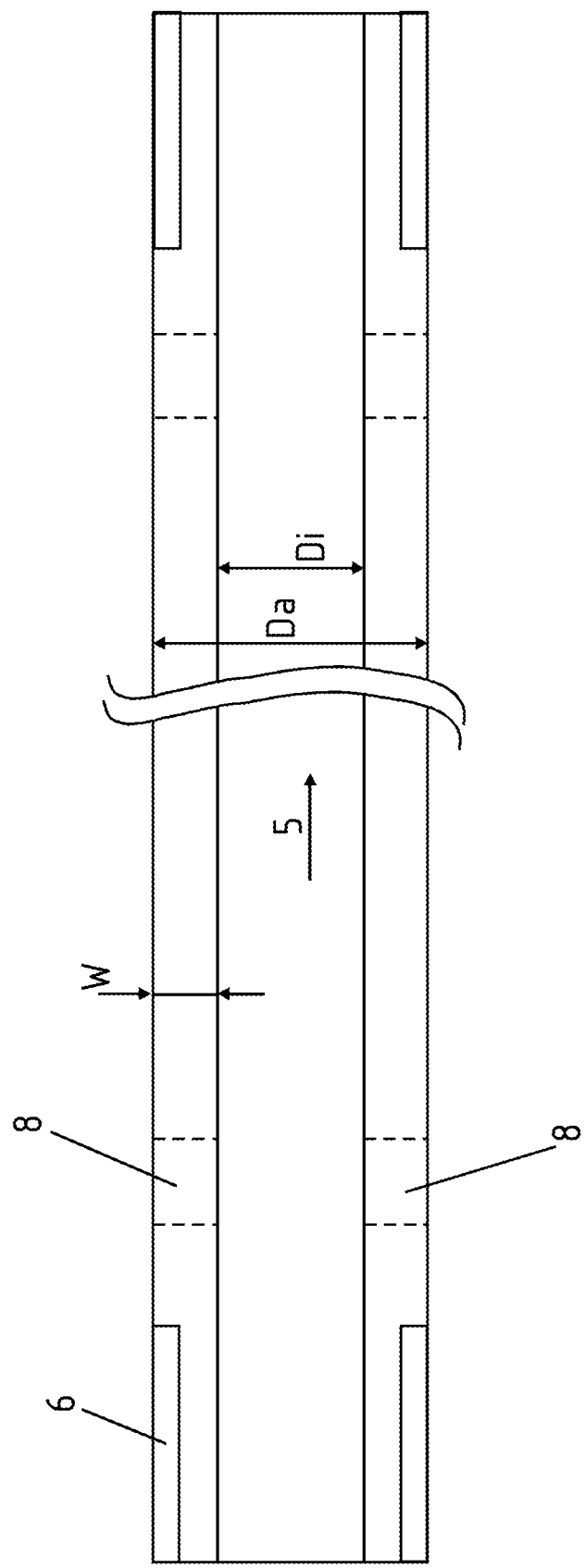
FIG. 3 is a longitudinal sectional view of the OCTG pipe shown in FIG. 1.

FIG. 1 shows an OCTG pipe 1 having an overall length L. The OCTG pipe 1 has a centrally arranged pipe body 2 and a pair of connection ends 4 each formed at each of the opposing ends 3 of the pipe body 2. The connection ends 4 extend in a longitudinal direction 5 of the OCTG pipe 1 over a partial length of the pipe, identified as length L4, which preferably is 200 mm to 500 mm long. External thread 6 is formed on the connection ends 4. The external thread 6 extends in the longitudinal direction 5. The external thread 6 extends with a length L6 in the longitudinal direction of the OCTG pipe 1. The length L6 is smaller than the length L4. More specifically, the length L6 of the external thread 6 is up to 75 mm in the longitudinal direction 5. The external thread 6 is, alternatively, cut directly into the outer shell surface 7 of the OCTG pipe 1. Consequently, an outer diameter Da of the OCTG pipe 1 is approximately uniform throughout. The same applies to an inner diameter Di illustrated in FIG. 2 and FIG. 3, which is likewise configured to be uniform throughout.

The inner diameter Di is preferably configured to be uniform throughout. However, the inner diameter Di may be reduced in the region of the ends 3, in particular in the region of the external thread 6. This is realized in particular by way of an upsetting process (not illustrated in detail). Also, the outer diameter Da may be increased in the region of the connection end 4, in particular in the region of the external thread 6 (also not illustrated). Also, a transition section 8 between the connection end 4 and the pipe body 2 is illustrated.

The transition section 8 likewise extends with a length L8 in the longitudinal direction 5 of the OCTG pipe 1. The length L8 is preferably from 50 mm to 200 mm. The transition section 8 is not readily mechanically identifiable on the pipe 1. The material structure in the region of the connection end 4 has a greater hardness than the material structure of the pipe body 2. In the transition section 8, the material structure transitions from the hard connection end 4 to the relatively soft and ductile pipe body 2.

Figure 4:
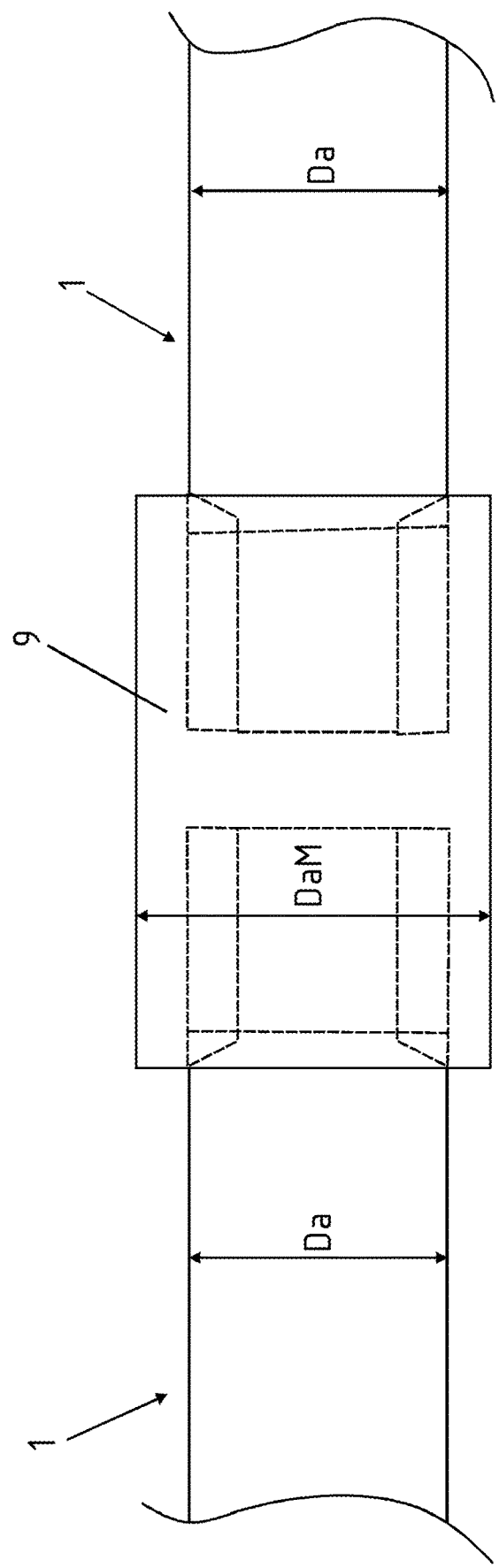
FIG. 4 illustrates an OCTG pipe system.

FIG. 4 illustrates two OCTG pipes 1, which are coupled to an OCTG pipe connection sleeve 9. The pipe connection sleeve 9 has an outer diameter DaM greater than the outer diameter Da of the respective OCTG pipes 1. In relative terms, however, the outer diameter DaM of the pipe connection sleeve 9 is smaller than the outer diameter of a sleeve known from the prior art.

Figure 5:
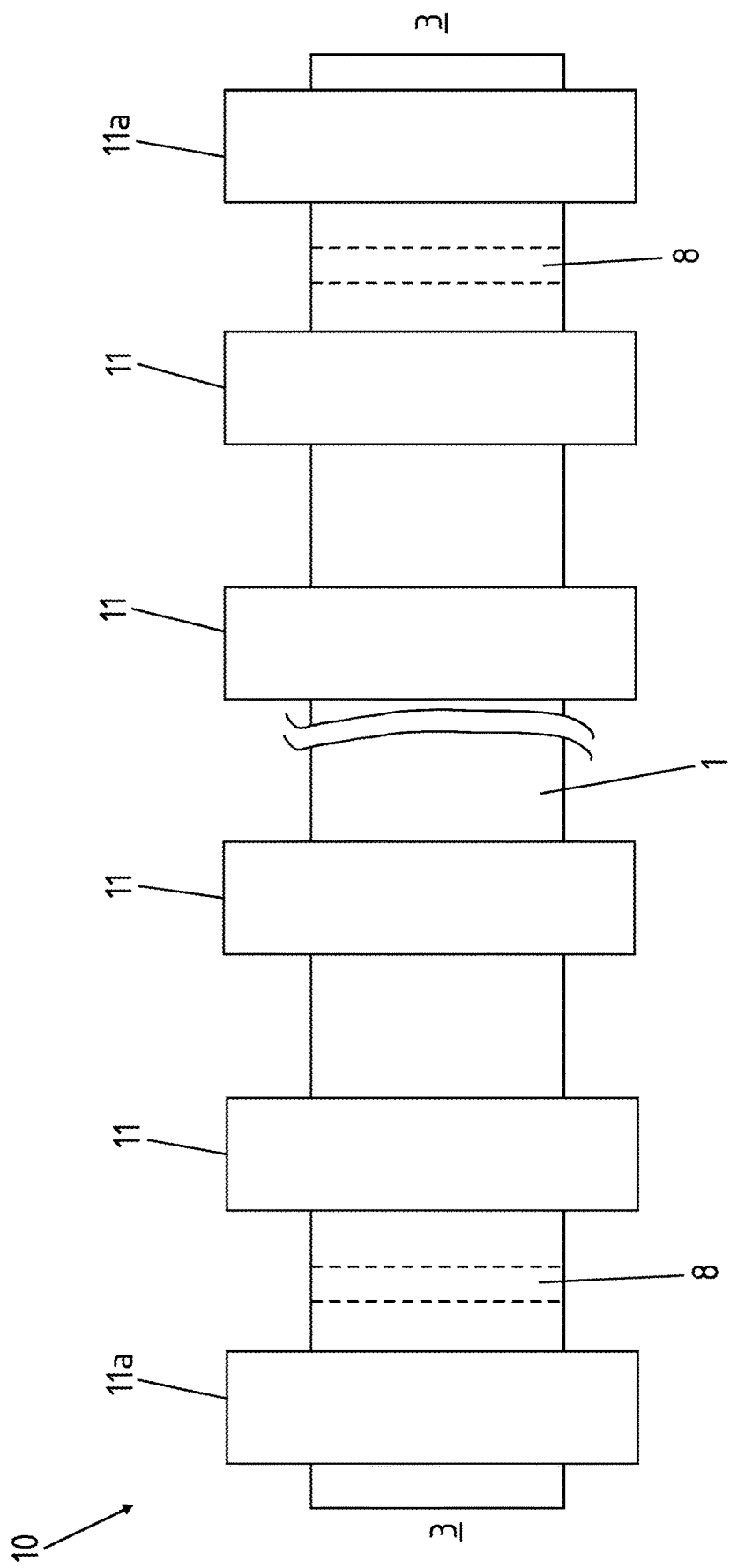
FIG. 5 illustrates a static apparatus for the annealing of the OCTG pipe.

FIG. 5 illustrates a static annealing apparatus 10 having multiple induction coils 11, 11a. An OCTG pipe 1 is introduced and is surrounded by the induction coils 11, 11a. The induction coils 11a are arranged at the outer region of the OCTG pipe 1. The induction coils operate with relatively low energy, such that the hardened OCTG pipe 1 is subject to less intense annealing in the region at the ends 3. The transition section is produced in flowing as a result of the heat conduction within the pipe wall.

Figure 6:
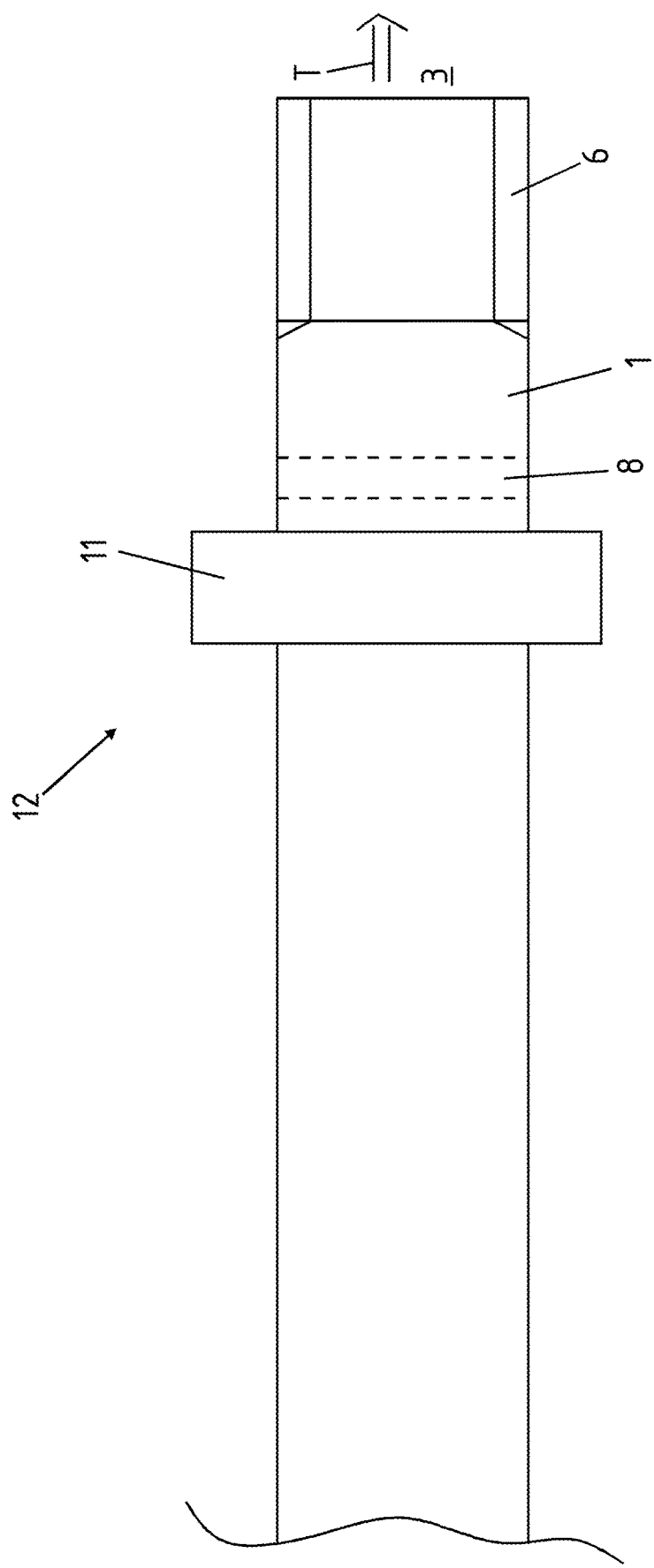
FIG. 6 illustrates an annealing apparatus through which an OCTG pipe is guided.

FIG. 6 illustrates an annealing apparatus 12 through which the OCTG pipe 1 is caused to perform a relative movement. The annealing apparatus 12 has an induction coil 11, and the OCTG pipe 1 is moved in the transport direction T through the induction coil 11. In part mutually different strength may be set through variation of the transportation speed in the transport direction T and/or by means of the energy density introduced into the OCTG pipe 1 by means of the induction coil 11.

Alternatively and/or additionally, multiple induction coils 11, 11a may be arranged and actuated separately, such that, for example, one coil 11, 11a is utilized in permanent operation and thus gives rise to a uniform introduction of heat in the OCTG pipe 1 being heat-treated/annealed in each case. A further coil 11a may then introduce additional heat into the pipe 1 intermittently, in particular in the region of the pipe body 2, and thus lead to a more intense annealing effect.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A pipe system for oil country tubular goods (OCTG), the pipe system comprising:
   at least one OCTG pipe having
      a pipe body,
      at least one connection end formed in unipartite and materially integral manner with the pipe body for coupling to a second OCTG pipe, and
      a transition section between the connection end and the pipe body of the OCTG pipe,
   wherein the OCTG pipe is formed in seamless fashion from a hardenable steel alloy, and wherein a yield strength of the OCTG pipe at the connection end is higher than the yield strength of the OCTG pipe at the pipe body,
   wherein the yield strength decreases in the transition section from the connection end to the pipe body with a gradient of greater than 10%, and a material structure in the connection end is completely hardened, and
   wherein the transition section extends with a length between 10 mm and 300 mm, in a longitudinal direction of the OCTG pipe.

2. The OCTG pipe system of claim 1,
   wherein the connection end has an outer diameter which is smaller than or equal to an outer diameter of the pipe body, and
   wherein the connection end has a wall thickness which is smaller than or equal to a wall thickness of the pipe body.

3. The OCTG pipe system of claim 2, further comprising:
   an external thread which is cut into an outer shell surface of the OCTG pipe at the connection end.

4. The OCTG pipe system of claim 3,
   wherein the yield strength of the OCTG pipe at the connection end lies between 800 and 1300 MPa, and the yield strength of the OCTG pipe at the pipe body lies between 500 and 900 MPa, and
   wherein the yield strength of the OCTG pipe at the connection end is at least 10% greater than the yield strength of the OCTG pipe at the pipe body.

5. The OCTG pipe system of claim 4, further comprising:
   a pipe connection sleeve which is formed from a hardenable steel alloy and has a yield strength of between 800 and 1300 MPa.

6. The OCTG pipe system of claim 5,
   wherein the pipe connection sleeve is formed from a hardenable steel alloy and has a yield strength of between 900 and 1200 MPa.

7. The OCTG pipe system of claim 4,
wherein the yield strength of the OCTG pipe at the connection end lies between 900 and 1200 MPa, and the yield strength of the OCTG pipe at the pipe body lies between 600 and 800 MPa.

8. The OCTG pipe system of claim 3,
wherein the connection end extends in the longitudinal direction of the OCTG pipe with a length of 200 mm to 500 mm, the external thread extending with a length of up to 300 mm in the longitudinal direction.

9. The OCTG pipe system of claim 3,
wherein the connection end extends in the longitudinal direction of the OCTG pipe with a length of 200 mm to 500 mm, the external thread extending with a length of up to 100 mm in the longitudinal direction.

10. The OCTG pipe system of claim 1, wherein the transition section extends with a length of between 50 mm and 200 mm, in the longitudinal direction of the OCTG pipe.

11. A method of producing an oil country tubular goods (OCTG) pipe, the method comprising:
providing a seamlessly rolled, cut-to-length pipe of a hardenable steel alloy,
homogeneously warming and quench hardening the pipe, and
annealing the hardened pipe, wherein a connection end of the pipe is annealed with a lower intensity than a pipe body of the pipe, to obtain the OCTG pipe in which
the connection end is formed in unipartite and materially integral manner with the pipe body for coupling to another OCTG pipe,
a transition section is formed between the connection end and the pipe body of the OCTG pipe,
the OCTG pipe is formed in seamless fashion from the hardenable steel alloy,
a yield strength of the OCTG pipe at the connection end is higher than at the pipe body,
the yield strength decreases in the transition section from the connection end to the pipe body with a gradient of greater than 10%, and a material structure in the connection end is completely hardened, and
the transition section extends with a length between 10 mm and 300 mm, in a longitudinal direction of the OCTG pipe.

12. The method of claim 11, further comprising, before the quench hardening or after the quench hardening,
cutting an external thread in a region of the connection end.

13. The method of 12,
wherein the annealing is performed in a static annealing apparatus, or the hardened pipe is caused to perform a relative movement through an annealing apparatus in the annealing, and
wherein introduction of heat is performed with different parameters in different length sections in the respective annealing apparatus.

14. The method of claim 11,
wherein the yield strength of the OCTG pipe at the connection end lies between 900 and 1200 MPa, and the yield strength of the OCTG pipe at the pipe body lies between 600 and 800 MPa.

* * * * *